March 9, 1954     J. G. BAKER     2,671,380
PHOTOGRAPHIC OPTICAL OBJECTIVE LENS SYSTEM
Filed June 14, 1952

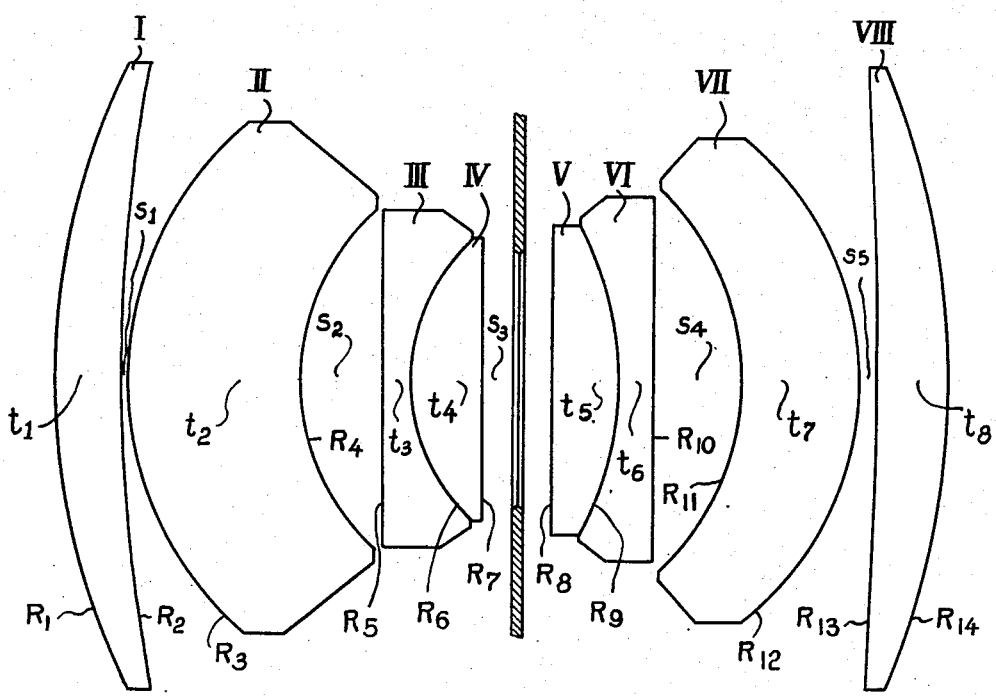

Objective: EFL 1.000    $f/3.5$

| Lens | $N_D$ | V | Glass Types | Radii | Thicknesses |
|---|---|---|---|---|---|
| I | 1.613 | 57.3 | SK-19 | $R_1 = 0.5108$ | $t_1 = 0.0493$ |
|   |       |      |       | $R_2 = 1.2170$ | $s_1 = 0.0041$ |
| II | 1.516 | 64.0 | BK-7 | $R_3 = 0.2453$ | $t_2 = 0.1297$ |
|    |       |      |      | $R_4 = 0.1672$ | $s_2 = 0.0616$ |
| III | 1.596 | 39.2 | F-8 | $R_5 = $ plano | $t_3 = 0.0205$ |
| IV | 1.613 | 58.6 | SK-4 | $R_6 = 0.1416$ | $t_4 = 0.0534$ |
|    |       |      |      | $R_7 = $ plano | $s_3 = 0.0534$ |
| V | 1.613 | 58.6 | SK-4 | $R_8 = $ plano | $t_5 = 0.0493$ |
| VI | 1.596 | 39.2 | F-8 | $R_9 = -0.2415$ | $t_6 = 0.0246$ |
|    |       |      |     | $R_{10} = $ plano | $s_4 = 0.0657$ |
| VII | 1.516 | 64.0 | BK-7 | $R_{11} = -0.1871$ | $t_7 = 0.0848$ |
|     |       |      |      | $R_{12} = -0.2253$ | $s_5 = 0.0144$ |
| VIII | 1.606 | 43.9 | BaF-4 | $R_{13} = -3.7296$ | $t_8 = 0.0534$ |
|      |       |      |       | $R_{14} = -0.5852$ | $s_6 = 0.6060$* |

*$S_6$ = back focus.

INVENTOR
James G. Baker
BY Pennie Edmonds Morton Barrows Taylor
ATTORNEYS

Patented Mar. 9, 1954

2,671,380

UNITED STATES PATENT OFFICE 2,671,380

PHOTOGRAPHIC OPTICAL OBJECTIVE LENS SYSTEM

James G. Baker, Winchester, Mass., assignor to The Perkin-Elmer Corporation, Glenbrook, Conn., a corporation of New York Application June 14, 1952, Serial No. 293,603

13 Claims. (Cl. 88—57)

This invention relates to optical objectives for photographic purposes, which are corrected for spherical and chromatic aberrations, coma, astigmatism, field curvature, and distortion. More particularly, the invention is concerned with a novel photographic objective, which is especially suitable for night aerial photography and is characterized not only by improved correction for all the lower order aberrations, the control of which is essential in meeting the performance requirements for modern precision objectives, but also by improved correction for oblique spherical aberration.

In my copending application Ser. No. 198,010, filed November 28, 1950, now Patent 2,628,532, issued February 17, 1953, I have disclosed expedients for minimizing secondary spectrum and oblique spherical aberration of lens systems, but a system, in which such results are achieved by the use of those expedients, is quite complicated and expensive to manufacture. However, if a photographic lens system is to be employed in a limited region of the spectrum, such as the red, it becomes possible to devise a system having performance of a high standard and giving excellent resolution, even in the presence of secondary spectrum. It is, accordingly, one of the purposes of the present invention to provide a novel optical system for use under the conditions described which has all the merits of that of the copending application except for not being especially corrected for secondary spectrum and is considerably simpler.

In modern aerial photography, the lens system employed should give an angular field as large as possible and, where the format size is determined by other considerations, the focal length of the system must be chosen to give as large an angular field as possible within scale requirements. At the same time, if the system is to be used for night photography, it must be of high speed in order to obtain sufficient photographic exposure. Accordingly, photographic systems for night aerial photography should cover fields up to 45° at speeds approximating f/3 and with focal lengths up to 36". It is also necessary that such systems, despite the enhanced characteristics mentioned, provide angular resolution over the entire field of the order of a few seconds of arc. Such a lens system, if attained, provides a nearly ideal solution for the current problems of night aerial photography.

To meet the present standards of lens performance in the field of night aerial photography, it is necessary that the lens system employed have a resolving power averaging thirty to forty lines per millimeter over the field of view at high contrast and the system must provide optical images of good microscopic contrast. To attain such performance with a lens system not corrected for secondary spectrum, it is necessary to use a suitable color filter matching the sensitivity of the photographic emulsion and the illumination characteristics of the flash bomb employed. In the spectral region of maximum efficiency, the correction of the lens system must be such that it will give pictures in the image plane of the same high order of quality now expected of a miniature camera lens of 2" focal length. Since the focal length of the aerial objective may be ten or more times greater than that of a miniature camera lens, it is evident that such an objective will be fairly complicated, at best. However, the system of the present invention may include only eight elements as distinguished from the eleven required in the system of my prior patent, above identified.

Another problem of considerable importance in night aerial photography is that of providing a lens system which will have a minimum amount of vignetting, so that the exposure at the corners of the field will be not less than thirty to forty per cent of the exposure at the center of the field with the cosine fourth power law taken into account. With so much of the light allowed to reach the image at the edge of the field, it is essential that the optical aberrations of the objective be corrected to an extent substantially beyond that heretofore attained. Many standard lenses rated as fast are nevertheless afflicted by such a degree of vignetting that the average photographic speed over the field of view is much less than the rated speed. In many such lenses, vignetting is purposely employed to cut off rays, which would form a poor photographic image. It can be readily seen that, if such rays are to be admitted for the purpose of maintaining the light intensity to the edge of the field, it is important that the optical design be of unusual quality. Obviously, a lens rated at f/3.5 on axis, but actually f/7 at the edge of the field, is not as well suited to night aerial photography as a lens having a speed of f/3.5 to f/4.5 over the entire field.

The present invention resides in an optical objective for photographic purposes, and particularly for night aerial photography, which meets all the requirements above set forth. The new objective yields sharp images over a wide though limited spectral range, has the desired resolution and contrast throughout the field, and is subject to so little vignetting that the illumination is uniform over the field within the specified limits.

The new objective is in some respects related to the six element form of lens known as the Biotar, which comprises negative menisci lying between positive components in a generally symmetrical arrangement around a central stop. The ordinary Biotar lens suffers from oblique spherical aberration reaching a substantial magnitude at large off-axis angles and this aberration is enhanced by great focal length and large aperture. The Biotar lens is thus not well suited to the purposes of night aerial photography, unless it can be modified to improve the correction for oblique spherical aberration. In the usual Biotar lens, the central negative surfaces adjacent each other around the central stop are separated by a distance not greater than the shorter of the radii of the two surfaces. The oblique spherical aberration is then caused primarily by the refractions of the upper rim ray at the first of the two surfaces and of the lower rim ray at the second surface. In my Patent 2,532,751, issued December 5, 1950, I have disclosed how the oblique spherical aberration in a lens of the Biotar form can be reduced by increasing the separation of the central negative surfaces, but there is an upper limit to the improvement which can be attained in this manner, since the oblique spherical aberration can be reduced by an increased separation, but cannot be brought fully to zero. In order to obtain oblique spherical aberration equal to zero at a mean field angle and aperture in such a lens, compensating refractions of equal magnitude, but opposite in sign, must be employed.

The lens system of the invention resembles the Biotar lens in including a pair of negative menisci lying between outer components of net collective effect and around a central stop, but differs from the conventional Biotar lens in the employment of hyperchromatic cemented doublets in the central air space between the two steep negative surfaces of the menisci for the purpose of eliminating oblique spherical aberration. At the same time, a proper choice of glasses for the doublets serves to correct the optical system for color. Because of this, the negative meniscus components on either side of the doublets can be single elements instead of compounded, although the latter construction may have advantages in the larger number of parameters that may result in even greater improvements. The use of the smaller cemented doublets in the central air space, accordingly, not only achieves correction for oblique spherical aberration and color, but also brings about economy in manufacture.

The doublets in the central air space of the new lens may have positive or negative powers of appreciable magnitude, but, in the preferred form of the new objective, each doublet has plano air surfaces in order that a relatively inexpensive form of large lens system with all the other desired characteristics may be obtained. Each doublet is preferably made of an element of medium index flint glass and an element of higher index crown glass, so that the cemented surface in each doublet represents a positive refraction. The net power of each doublet in the preferred form is thus slightly positive and, when the doublets have plano air surfaces, the power of each doublet lies between 0 and 0.4 measured in terms of the overall power of the whole objective taken as unity. The construction described also favors the correction of the Petzval curvature. The new objective accordingly has all the desired characteristics of that of the copending application and, in addition, is corrected for oblique spherical aberration by the use of components of relatively simple form.

An objectionable feature of lenses of the Biotar type is that, with large angular fields, the higher order astigmatism becomes pronounced. The tangential focal surface in the outer part of the field tends to become shorter with increasing off-axis angle, and, in a lens of 45° angular coverage with a speed of f/3.5 and 24" focal length, the tangential focal surface may be as much as four to six millimeters too short at the edge of the field. While it is possible to reduce this higher order of astigmatism by adoption of a relatively thin second negative meniscus component, the result is to steepen the curvatures of the system, and thereby increase the oblique spherical aberration. In the lens of the present invention, the reduction of the higher order of astigmatism is brought about by favorable refractions through the central doublets. The high incidence angle of the bundle of rays on the leading surfaces of the doublets tends to favor the negative higher order of astigmatism over the positive. As a result, in the outer field of view, the general tendency of the tangential focal surface is no longer to curve forward as in prior lenses, but to curve backward and coalesce with the radial focal surface.

In a large aerial lens of 24" focal length covering a format as large as 9" by 18", the amplitude of the departure of the focal surface from a plane can reach values as large as three to five millimeters. Obviously, so large a departure will reduce the performance drastically, if the photographic emulsion lies on a flat surface, as is the usual case. In the system of the invention, the amplitude of the departure of the focal surface from a flat plane has been minimized, as far as possible, by employing relatively steep curves around the central stop, and, at the same time, the lens thicknesses and separations used keep the contributions, surface by surface, to the aberrations at a minimum. To some extent, the use of steep and nearly concentric curves causes enhanced spherical aberration, but this aberration is well controlled in the new lens. On the optical axis, the fifth and higher order spherical aberration is brought nearly to zero by the steep positive refracting cemented surfaces of the central doublets and, in this way, the performance on the optical axis can be kept close to or inside the Rayleigh limit, with resulting high quality performance. In the formation of the image at off-axis angles, the oblique spherical aberration of the steep negative surfaces of the menisci tends to dominate, but, before this aberration has exceeded tolerable limits, the compensating refracting cemented surfaces of the doublets come into play, so that, at a definite off-axis field angle, the oblique spherical aberration for a mean aperture is completely corrected. The correction provided by the cemented surfaces of the doublets reduces the oblique spherical aberration to a hybrid or zonal spherical aberration of the seventh and higher orders. The extent of the zonal departure from perfection is so small that the optical image remains adequately sharp for the purposes for which the new objective is to be used. At still higher off-axis angles, the limited amount or vignetting present in the new system tends to reduce the aperture with resultant improved correction of the oblique spherical aberration and with the result that the overall oblique spherical aberration is kept within acceptable limits. Near the corners of the field, the oblique spherical aberration of opposite sign begins to predominate, but before this aberration reaches intolerable proportions, the field of view is terminated. Accordingly, in the new lens, a high degree of perfection over the required angular field is achieved.

In order that the new lens may be a practical one, use is made of optical glasses of known high transparency in considerable thicknesses, and the meniscus elements, which are very thick, are preferably made of a borosilicate crown glass. The use of a glass of so low an index tends to favor the reduction of the Petzval sum, although the steep curves required, when such a glass is used, are ordinarily disadvantageous. However, steep curves favor an overall uniformity of image quality, when the oblique spherical aberration is kept in bounds by means of the compensating doublets used in the lens.

In the lens of the invention, the front and rear outer components of net collective effect may be, or include, a positive element. The index of refraction of the positive element of the front component should be high, but need not be as high as that of the glasses used in the outer components of the lens of Patent 2,628,532. Accordingly, the positive element of the front outer component of the present lens does not require an expensive type of glass. Also, if this element were of an index as high as 1.7, the corresponding V-value of ordinary materials would introduce a substantial amount of color into the system and the doublets in the central air space would then either have to be made of high index materials with low V-values, or else have undesirable powers or cemented surfaces of undesirably steep curvatures. Accordingly, in the new lens, the positive element of the front outer component is made of a glass of a medium index ranging from about 1.57 to about 1.64, with corresponding V-values ranging from about 62 to about 55. If the index of this element falls below about 1.57, the curvature of the element becomes excessive and is accompanied by higher order of astigmatism, which is beyond the corrective power of the central negative doublets and is thus undesirable in an aerial lens. If the index of the element exceeds 1.64, the corresponding V-value will be sufficiently lower than 55 to result in the introduction of more color than the central doublets can correct. Accordingly, the optimum values of the index and of the V-value of the glass used in the positive element of the front outer component lies within the ranges specified, with the preferred value of the index about 1.61 and the preferred V-value about 57.

Even though the positive element of the front outer collective component has a V-value within the ranges specified, the amount of color introduced thereby necessitates the use of fairly strong negative doublets with the front doublet the stronger. Some over-correction of lateral color results from this arrangement and this is taken care of as follows: The positive element of the rear outer component is made of a glass having an index within the range of 1.57 and 1.64, as in the case of the front outer component, and the preferred value of the index is again about 1.61. The V-value of this glass is within the range of 40, corresponding to an index of 1.64, and 55, corresponding to an index of 1.57, the preferred V-value being about 44 for the glass of the preferred index of 1.61. While it is possible to obtain an optical material of an index of about 1.64 and a V-value lower than about 40, the low V-value is likely to provide too strong a correction for the over-corrected lateral color. Also, the system then becomes more asymmetrical and the higher order aberrations increasingly troublesome. If the material employed in the positive element of the rear outer component has a V-value above 55, the lateral color cannot be corrected without introducing an asymmetry into the design in the opposite direction.

The index of refraction for the negative meniscus components, which are the second and seventh in the system, must likewise lie between reasonable limits. In order to achieve satisfactory transmission with considerable glass thicknesses, it is important to employ glass of an index not exceeding 1.54. Also, if the index exceeds 1.54, the curvatures are reduced to such an extent as to favor image correction in the central part of the field over that in the outer part and this is objectionable in the new lens, in which uniformity of image quality throughout the field is desired. The lower limit of the index of refraction of the negative meniscus components may be set at 1.48, since, if the index is less than that value, the thickness of the glass required becomes excessive and the cost of the components is greatly increased. For the reasons stated, therefore, the index of refraction of the negative meniscus components should range from 1.48 to 1.54, and, if the menisci are compounded rather than simple elements, the average index should lie within the specified range.

The use of negative meniscus components in the form of simple elements is advantageous in reducing the effect of the zonal aberration in the field curvature. In the new lens, the choice of curves of intermediate steepness for the negative meniscus components and for the remaining parts of the system has made is possible to keep the amplitude of the curvature of the field at the worst zone down to about 1.5 mm. in a lens of 24" focal length and 45° field. Such an aberration is, however, sufficient to cause a marked loss of resolution, but it has been found possible in the new lens to overcome this loss resulting from the image being out of focus on a flat image plane by introducing a color dispersion in the astigmatism in the outer field.

The color dispersion referred to is introduced by the uncorrected bundle of rays striking the first cemented doublet. The first negative meniscus element, that is, the second component of the system, is not sufficiently strong to correct the beam of light for color up to that point, and the beam is, thus, somewhat chromatic at the time it strikes the first surface of the first cemented doublet. By the time the beam reaches the second surface of this doublet, where a compensating refraction for the astigmatism might be expected to occur, the color correction has been partly effected by the cemented surface between media of widely different V-values. The same phenomenon occurs at the second cemented doublet and the light coming out is less over-corrected than the light entering at the first surface of the first doublet is undercorrected. Accordingly, the doublets bring about a dispersion in the astigmatism of the third and higher orders, which, in the outer field, tends to produce a variety of focal surfaces within a small range along the optical axis. The photographic emulsion tends to favor the color most nearly in focus for the image of a bright point, and the other colors are somewhat out of focus. While this circumstance is not ideal, it is, nevertheless, better than having all colors uniformly out of focus. The new lens thus produces an image always having a sharp central core of high light intensity surrounded by a uniform out-of-focus blur of the other colors. If all the colors were combined upon a common focal surface about a millimeter out of focus, the image of a bright point would reach the emulsion as a uniformly illuminated blur, but the resolution would then be materially reduced. If the compromise of factors employed in the new lens to obtain depth of focus were utilized in a conventional lens, in which the zonal aberration in the field curvature may amount to as much as 3 mm. or more, the chromatic dispersion introduced would be marked enough to cause its own image deterioration.

It is possible in the new lens to combine the correcting central doublets into a single cemented component in the central air space between the negative menisci without materially affecting the optical performance, but it is preferable to employ separate doublets to provide an air space between them for receiving an iris diaphragm and a shutter. The axial length of the air space between the doublets should lie within the range of about 0.01f to about 0.10f, f being the focal length of the objective. The proper choice of glasses for each doublet includes a flint negative element cemented to a higher index positive crown element. The cemented surface in each doublet then becomes positively refracting and hence not only can correct the oblique spherical aberration, but also reduces or eliminates the higher order spherical aberration on the optical axis. With the cemented surface lying between media of quite different V-values, some chromatic dispersion is introduced into the spherical aberration and into the coma, but, when the system is used in a restricted spectral range, such as that produced by a red filter and a red-sensitive emulsion, the chromatic spherical aberration does not exceed tolerable limits. The new system is not intended for use over a wider spectral range, although it is to be understood that the range, for which it is suitable, may be varied by well-known modifications of the system. Because it is to be used in a limited spectral range, it has been possible to neglect secondary spectrum, or at least keep it at the level ordinarily attained heretofore.

Calculations show that the acceptable difference in index of refraction across the cemented surfaces of the doublets lies within a fairly narrow range. If this difference in index reaches .04, the curvatures are not sufficient for the available glass types to effect chromatic correction of the system as a whole. On the other hand, if the index difference is as small as .01, either the curvatures become too steep for practical use, or else oblique spherical aberration is not eliminated. Calculations show that, for best results, the difference in index should range from about .015 to about .03.

Calculations also show that there are practical limits on the range for the index of the positive element in each of the cemented doublet components. If the index of the positive element falls below 1.55, there are at present no available glass types with sufficient difference in V-value to effect the desired color correction, when all the other characteristics of the system are optimum. If the index of the positive element exceeds 1.65, the glasses, which must be used, are expensive and characterized by a yellowish tinge. Such glasses would be suitable for lenses of shorter focal length, but they are not useful for very large lens systems. Accordingly, the index for the positive elements of the cemented doublet components should range between 1.55 and 1.65 for best results. The lower limit of the index of the negative element of each doublet is then 1.52 and its upper limit 1.635, in order that the difference in index may lie within the specified range.

The single figure of the drawing is a cross-sectional view of a lens system representing one embodiment of the invention, together with a table containing the data for a typical system.

The system of the drawing is about in the mean of the range of possible lenses embodying the invention and is a practical lens. The specifications of this lens are as follows:

[Objective: EFL 1.000.  f/3.5]

| Lens | $N_D$ | V | Glass Types | Radii | Thicknesses |
|---|---|---|---|---|---|
| I | 1.613 | 57.3 | SK-19 | $R_1 = 0.5108$ | $t_1 = 0.0493$ |
|   |       |      |       | $R_2 = 1.2170$ | $S_1 = 0.0041$ |
| II | 1.516 | 64.0 | BK-7 | $R_3 = 0.2453$ | $t_2 = 0.1297$ |
|   |       |      |       | $R_4 = 0.1672$ | $S_2 = 0.0616$ |
| III | 1.596 | 39.2 | F-8 | $R_5 =$ plano | $t_3 = 0.0205$ |
| IV | 1.613 | 58.6 | SK-4 | $R_6 = 0.1416$ | $t_4 = 0.0534$ |
|   |       |      |       | $R_7 =$ plano | $S_3 = 0.0534$ |
| V | 1.613 | 58.6 | SK-4 | $R_8 =$ plano | $t_5 = 0.0493$ |
| VI | 1.596 | 39.2 | F-8 | $R_9 = -0.2415$ | $t_6 = 0.0246$ |
|   |       |      |       | $R_{10} =$ plano | $S_4 = 0.0657$ |
| VII | 1.516 | 64.0 | BK-7 | $R_{11} = -0.1871$ | $t_7 = 0.0848$ |
|   |       |      |       | $R_{12} = -0.2253$ | $S_5 = 0.0144$ |
| VIII | 1.606 | 43.9 | BaF-4 | $R_{13} = -3.7296$ | $t_8 = 0.0534$ |
|   |       |      |       | $R_{14} = -0.5852$ | $S_6 = 0.6060$ |

In the above table, the lens components are numbered from front to rear with the light assumed to come from the left. The values in the column headed $N_D$ are the refractive indices for the D line of the spectrum, and the values in the column headed V are those of reciprocal dispersion. The radii of curvature for the surfaces marked $R_1$ to $R_{14}$ are marked plus or minus, depending on whether the surfaces are convex or concave toward the oncoming light. The axial thicknesses of the elements and the length of the air spaces between them are designated $t$ and $S$, respectively, and are numbered from front to rear. $S_6$ indicates the back focus.

The objective shown in the drawing, and having the dimensions set forth in the table, comprises outer collective components I, VIII, which have the form of single elements and are made of medium index glasses with the front element having a V-value in the vicinity of 58 and the rear element having a V-value of about 44. Between the outer collective components lie two dispersive components II and VII having the form of simple meniscus elements, the menisci lying with their concave surfaces opposed. The two cemented doublets III, IV and V, VI between the two menisci have plano external surfaces and their cemented surfaces are concave to each other. The cemented doublets perform the function of correcting the color aberration for the system and, at the same time, reduce the Petzval sum and eliminate the oblique spherical aberration for a mean zone of the aperture at a mean zone of the field.

In the objective illustrated, the cemented surface of each doublet is more strongly curved than either of the air surfaces of the doublet and the cemented surfaces of both doublets have a radius of curvature substantially greater than 0.12f. These are desirable features of the new objective.

I claim:

1. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element of an index of refraction ranging from about 1.57 to about 1.64 with said element in the front component having a V-value ranging from about 62 to about 55, a pair of components of net negative effect between the outer components, each negative component having an average index of refraction ranging from about 1.48 to about 1.54, and a pair of cemented doublets of low optical power lying between the negative components and separated from each other by an air space ranging from about 0.01f to about 0.10f, f being the focal length of the objective.

2. An objective as defined in claim 1, characterized in that the front and rear outer components are simple elements.

3. An objective as defined in claim 1, characterized in that the components of net negative effect are meniscus in form and have their concave surfaces opposed.

4. An objective as defined in claim 1, characterized in that the components of net negative effect are single element menisci.

5. An objective as defined in claim 1, in which the cemented surfaces in the doublets are curved around a central stop.

6. An objective as defined in claim 1, in which each cemented doublet includes a positive element of an index of refraction ranging from about 1.55 to about 1.65 and a negative element of lower index, the cemented surfaces in the doublets being curved about a central stop and the index difference across the surfaces ranging from about 0.015 to about 0.03.

7. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element of an index of refraction ranging from about 1.57 to about 1.64 with said element in the front component having a V-value ranging from about 62 to about 55, a pair of meniscus components of net negative effect between the outer components, and a pair of hyperchromatic cemented doublets lying between the negative components and separated from each other by an air space ranging from about 0.01f to about 0.10f, f being the focal length of the objective, the doublets being of positive optical power with respect to the power of the objective as unity, and the cemented surface of each doublet being more steeply than either of the adjacent air surfaces of that doublet and the cemented surfaces of the doublets having respective radii of curvature substantially greater than 0.12f.

8. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element of an index of refraction ranging from about 1.57 to about 1.64 with said element in the front component having a V-value ranging from about 62 to about 55, a pair of components of net negative effect between the outer components, each negative component having an average index of refraction ranging from about 1.48 to about 1.54, and a pair of cemented hyperchromatic doublets lying between the negative components and separated from each other by an air space ranging from about 0.01f to about 0.10f, f being the focal length of the objective, the respective doublets having an optical power measured in terms of the overall power of the objective taken as unity ranging from about 0 to about 0.4 and having plano air surfaces.

9. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element of an index of refraction ranging from about 1.57 to about 1.64 with said element in the front component having a V-value ranging from about 62 to about 55, a pair of components of net negative effect between the outer components, each negative component having an average index of refraction ranging from about 1.48 to about 1.54, and a pair of cemented hyperchromatic doublets lying between the negative components and separated from each other by an air space ranging from about 0.01f to about 0.10f, f being the focal length of the objective, each doublet including a plano-concave negative element and a plano-convex positive element, the plano surfaces of the elements being air surfaces and the curved surfaces cemented together.

10. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element of an index of refraction ranging from about 1.57 to about 1.64 with said element in the front component having a V-value ranging from about 62 to about 55, a pair of components of net negative effect between the outer components, each negative component having an average index of refraction ranging from about 1.48 to about 1.54, and a pair of cemented hyperchromatic doublets lying between the negative components and separated from each other by an air space ranging from about 0.01f to about 0.10f, f being the focal length of the objective, the front doublet consisting of a front plano-concave negative element and a rear plano-convex positive element, the curved surfaces of the elements being cemented together and concave to the rear and the positive element having the higher index of refraction, the rear doublet consisting of a front plano-convex positive element and a rear plano-concave negative element, the curved surfaces of the elements being cemented together and concave to the front and the positive element having the higher index of refraction.

11. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element of an index of refraction ranging from about 1.57 to about 1.64 with said element in the front component having a V-value ranging from about 62 to about 55, a pair of components of net negative effect between the outer components, each negative component having an average index of refraction ranging from about 1.48 to about 1.54, and a pair of cemented hyperchromatic doublets lying between the negative components and separated from each other by an air space ranging from about 0.01f to about 0.10f, f being the focal length of the objective, each doublet including a positive element and a negative element of lower index than the positive element, the cemented surfaces of the doublets being concave to each other and the cemented surface of the front doublet having the steeper curvature.

12. An objective for photographic purposes corrected for spherical and chromatic aberrations, including oblique spherical aberration, coma, astigmatism, field curvature, and distortion and having greatly reduced vignetting, which comprises a pair of outer components of net collective effect, each including a positive element, said elements having substantially the same index of refraction ranging from about 1.57 to about 1.64 and the positive element in the front component having a V-value ranging from about 62 to about 55 while the V-value of the positive element of the rear component is lower, a pair of meniscus components of negative effect between the outer components, and a pair of hyperchromatic cemented doublets between the meniscus components and separated from each other by an air space ranging from about 0.01f to about 0.10f, f being the focal length of the objective, the cement surfaces of the doublets being concave to each other and that of the front doublet having the steeper curvature.

13. An objective for photographic purposes having numerical data substantially as follows:

[Objective: EFL 1.000.   f/3.5]

| Lens | $N_D$ | V | Glass Types | Radii | Thicknesses |
|---|---|---|---|---|---|
| I | 1.613 | 57.3 | SK-19 | $R_1 = 0.5108$ | $t_1 = 0.0493$ |
|   |       |      |       | $R_2 = 1.2170$ | $S_1 = 0.0041$ |
| II | 1.516 | 64.0 | BK-7 | $R_3 = 0.2453$ | $t_2 = 0.1297$ |
|    |       |      |      | $R_4 = 0.1672$ | $S_2 = 0.0616$ |
| III | 1.596 | 39.2 | F-8 | $R_5 = $ plano | $t_3 = 0.0205$ |
| IV | 1.613 | 58.6 | SK-4 | $R_6 = 0.1416$ | $t_4 = 0.0534$ |
|    |       |      |      | $R_7 = $ plano | $S_3 = 0.0534$ |
|    |       |      |      | $R_8 = $ plano |                |
| V  | 1.613 | 58.6 | SK-4 |                | $t_5 = 0.0493$ |
| VI | 1.596 | 39.2 | F-8  | $R_9 = -0.2415$ | $t_6 = 0.0246$ |
|    |       |      |      | $R_{10} = $ plano | $S_4 = 0.0657$ |
| VII | 1.516 | 64.0 | BK-7 | $R_{11} = -0.1871$ | $t_7 = 0.0848$ |
|     |       |      |      | $R_{12} = -0.2253$ | $S_5 = 0.0144$ |
| VIII | 1.606 | 43.9 | BaF-4 | $R_{13} = -3.7296$ | $t_8 = 0.0534$ |
|      |       |      |       | $R_{14} = -0.5852$ | $S_6 = 0.6060$ | in which I, II . . . represent the components beginning at the left, the corresponding indices of refraction for the D line of the spectrum are listed in the column headed "$N_D$," the corresponding values of reciprocal dispersion are listed in the column headed "V," the glass types of the components are tabulated in the column headed "Glass Types," $R_1$, $R_2$ . . . represent the radii of the surfaces, $t_1$, $t_2$ . . . represent axial thicknesses, $S_1$, $S_2$ . . . represent axial air separations, and $S_6$ represents the back focus.

JAMES G. BAKER.

References Cited in the file of this patent

UNITED STATES PATENTS

| Number | Name | Date |
|---|---|---|
| 435,271 | Abbe et al. | Aug. 26, 1890 |
| 871,559 | Beck et al. | Nov. 19, 1907 |
| 2,348,667 | Warmisham | May 9, 1944 |
| 2,494,025 | Altman | Jan. 10, 1950 |
| 2,516,724 | Roossinov | July 25, 1950 |
| 2,532,751 | Baker | Dec. 5, 1950 |
| 2,628,532 | Baker | Feb. 17, 1953 |

FOREIGN PATENTS

| Number | Country | Date |
|---|---|---|
| 168,923 | Great Britain | Sept. 12, 1921 |